S. I. HENDRIX.
TEMPERATURE ALARM.
APPLICATION FILED AUG. 27, 1914.
1,198,845.
Patented Sept. 19, 1916.
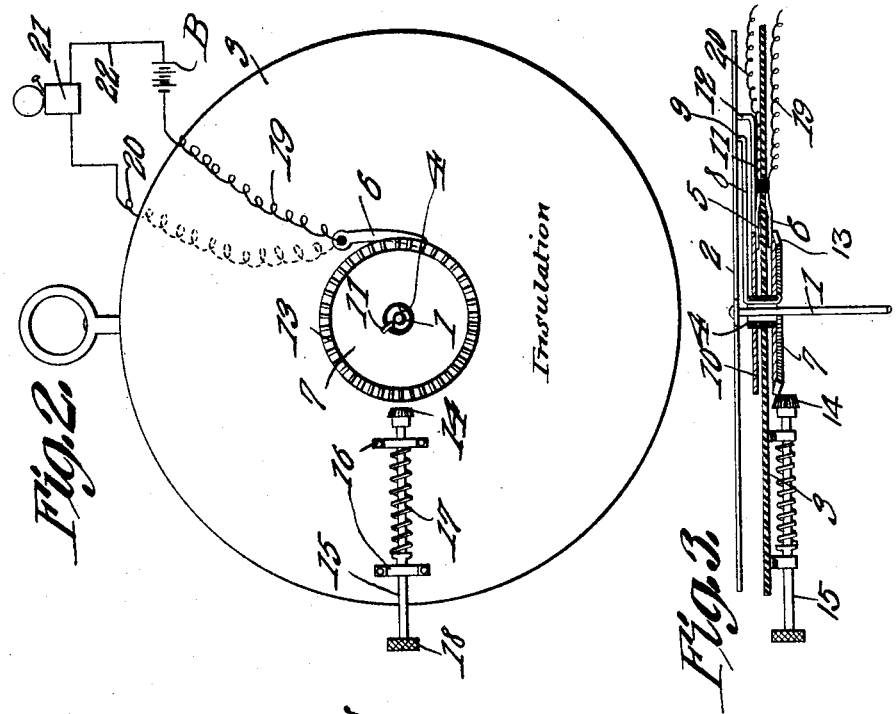
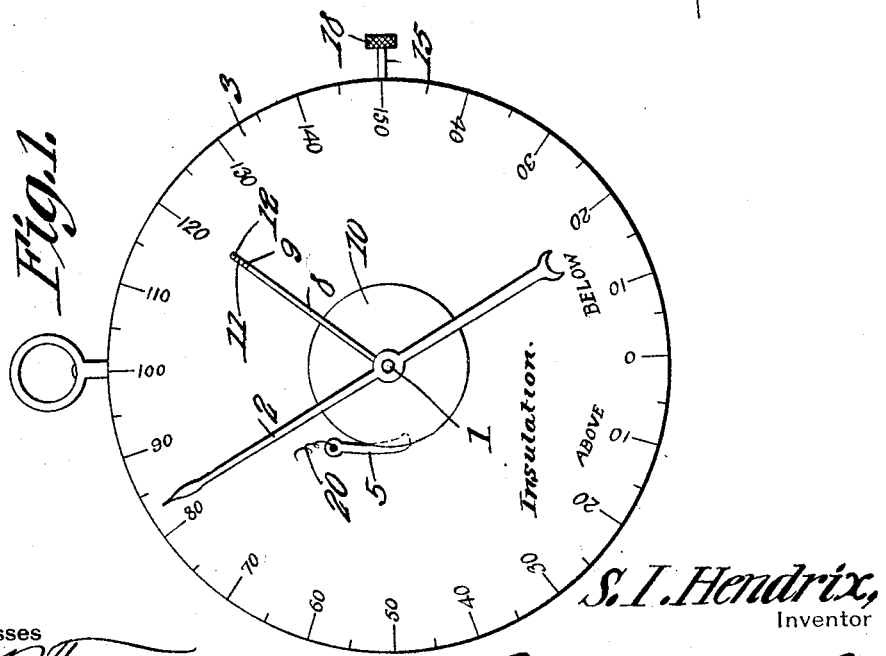
Witnesses
S. I. Hendrix,
Inventor
by
Attorneys

UNITED STATES PATENT OFFICE.

SAMUEL I. HENDRIX, OF CRESCENT CITY, FLORIDA.

TEMPERATURE-ALARM.

1,198,845.   Specification of Letters Patent.   Patented Sept. 19, 1916.

Application filed August 27, 1914. Serial No. 858,894.

*To all whom it may concern:*

Be it known that I, SAMUEL I. HENDRIX, a citizen of the United States, residing at Crescent City, in the county of Putnam and State of Florida, have invented a new and useful Temperature-Alarm, (Case B,) of which the following is a specification.

The present invention relates to improvements in a temperature alarm, and more particularly to a mechanism adapted to be attached for operation with a dial thermometer, in which the pointer thereof is moved in a circle to indicate the degrees of temperature, one object of the invention, being the provision of a novel circuit closing means adapted to be disposed at a maximum or minimum temperature scale and in the path of the pointer, so that when the pointer bridges both contacts, the circuit will be closed, said contact members being so mounted as to be non-interfering with the movement of the pointer in case the same should move beyond the minimum or maximum point after closing the contact.

A further object of the present invention, is the provision of an alarm of this character, which is readily attached to the usual form of dial thermometer, adjacent to the pointer arbor thereof and in ready operation, so that the contact carrying members thereof may be operated to be disposed adjacent the maximum or minimum scale at which the alarm is to be set, the same being provided with two resilient members which form conductors and which resist the accidental displacement of the contact so as to permit the contact to be moved with the pointer when engaged thereby so as not to interfere with the delicate mechanism of the thermometer.

A still further object of the present invention, is the provision of a simple, durable and inexpensive device of this character, which is readily applied to a dial of rotary thermometers, and which operates in a thoroughly efficient and practical manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the drawings: Figure 1 is a front elevation of a dial showing the present invention applied thereto. Fig. 2 is a rear view showing the mechanism for setting the contact terminals. Fig. 3 is a cross section thereof, the thermometer controlled mechanism for operating the pointer not being shown.

Referring to the drawings, the numeral 1 designates the arbor which is controlled by the thermometer mechanism (not shown), and which carries upon its end the usual pointer 2, the same being projected through the central aperture of the dial 3, all of usual structure.

Mounted in the opening of the dial 3 is a sleeve 4, made of insulating material, and upon which at the opposite sides of the dial 3 are secured the two disks 7 and 10, each of which are metal disks and constitute the terminal carrying member of the present device. The arbor 1 projects through the sleeve 4. Carried by the disk 7 is an arm 8 extending through the sleeve 4, which arm is provided with the contact terminal 9 disposed in the path of and to be engaged by the pointer 2, while carried by the disk 10 is an arm 11, which is provided with the contact terminal 12, said contact terminals 9 and 12 being disposed to remain in the same relative position at all times and both adapted to be bridged at the same time by the indicator or pointer 2.

Connected to the dial and insulated from each other, are the two resilient arms or contacts 5 and 6, the contact 5 being in electrical engagement with and acting as a slight retarding means for the disk 10, while the contact 6 is in electrical engagement with and acting as a slight retarding means for the disk 7. Thus when the arms 8 and 11 are adjusted and in proper position, adjacent to any indicating point of the dial as may be deemed necessary, they will be maintained in such position by the contacts 5 and 6 but when engaged by the pointer 2, will not offer sufficient resistance to retard or in any way disadvantageously effect the operation of the thermometer mechanism through the arbor 1. The contacts 5 and 6 are suitably insulated from one another. Thus, the dial 3, and member which secures the contacts 5 and 6 in place can be of insulating material.

In order to set the respective contacts 9 and 12 at the desired points relatively to the dial scale, there is attached to the periphery of the disk 7 a beveled portion 13, which is normally out of engagement with the small beveled pinion 14, mounted upon the rotatable and slidable stem 15, which is journaled in the brackets 16 at the rear of the dial 3 of the thermometer. Disposed upon the stem 15 so as to hold the gear 14 out of engagement with the gear 13, is a spring 17 while in order to manipulate the stem 15, the knurled knob 18 is carried thereby. Thus when it is desired to operate the disks 7 and 10 to simultaneously move the contacts 9 and 12 to the desired point, the stem 15 is pushed in until the gear 14 engages the gear 13, at which time the stem is rotated and consequently projects or moves the contacts 9 and 12 to the desired point.

In order to illustrate one mode of operating the alarm 21, the electrical diagram shown in connection with Fig. 2, includes the battery B, the conductor 19, the contact 6, the disk 7, the arm 8, the contact 9, the bridging portion of the indicator or pointer 2, the contact 12, the arm 11, the disk 10, the contact 5, the conductor 20, the audible alarm 21 and the conductor 22. Thus it will be seen that when the indicator or pointer 2 bridges the contacts 9 and 12, that the before mentioned circuit will be closed and the alarm 21 be energized.

From the foregoing description it is evident that the present device may be regulated to operate at maximum or minimum degrees of temperature and that it will not interfere with the rotatory or oscillatory movement of the pointer, and can be used in any case where it is desired to operate an alarm at any point that this rotatable indicating member is employed, the same being readily adapted for use in connection with steam gages, or other pressure gages and the like, or in connection with any mechanism that it is desired to thermostatically set in motion or stop.

What is claimed is:

A circuit closer embodying a dial, a sleeve of insulating material mounted for rotation therein, a pointer arbor extending through said sleeve and having a pointer coöperable with the dial, a pair of metallic disks secured upon the sleeve at the opposite sides of the dial, resilient insulated contacts carried by the dial and contacting with the respective disks, and arms carried by the disks and having contact terminals to be engaged simultaneously by the pointer, one of said arms extending through the sleeve.

In testimony that I claim the foregoing as my own, I have hereto affixed my signature in the presence of two witnesses.

SAMUEL I. HENDRIX.

Witnesses:
M. F. PIXTON,
C. E. GUTTERIDGE.

Copies of this patent may be obtained for five cents each, by addressing the "Commissioner of Patents, Washington, D. C."